July 15, 1958 G. T. KOEHLER ET AL 2,843,145
VALVE MECHANISM
Filed March 27, 1953 3 Sheets-Sheet 1
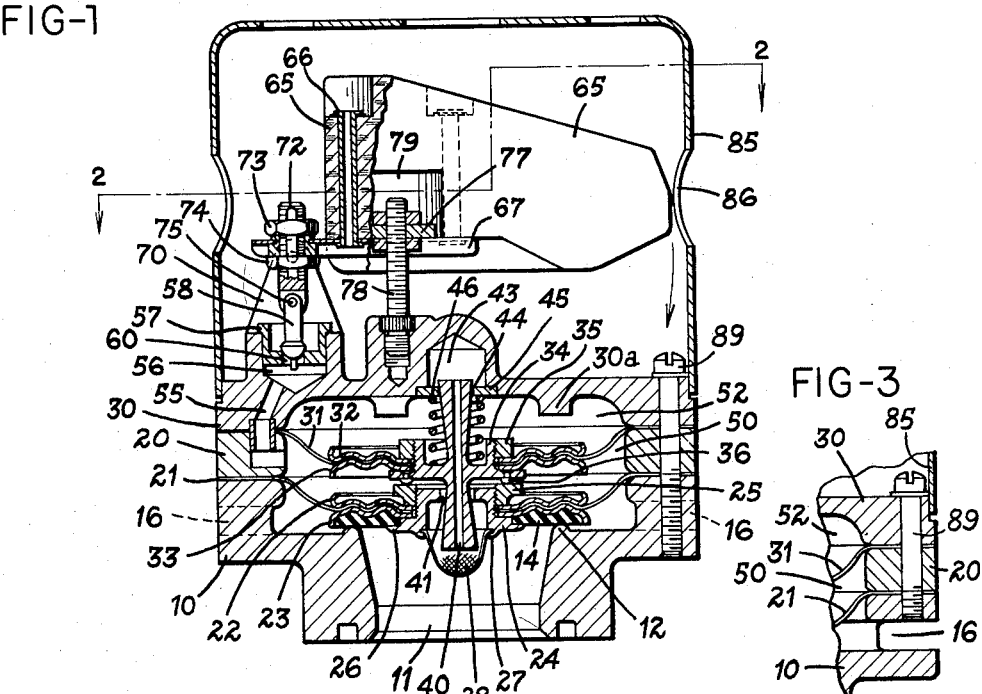
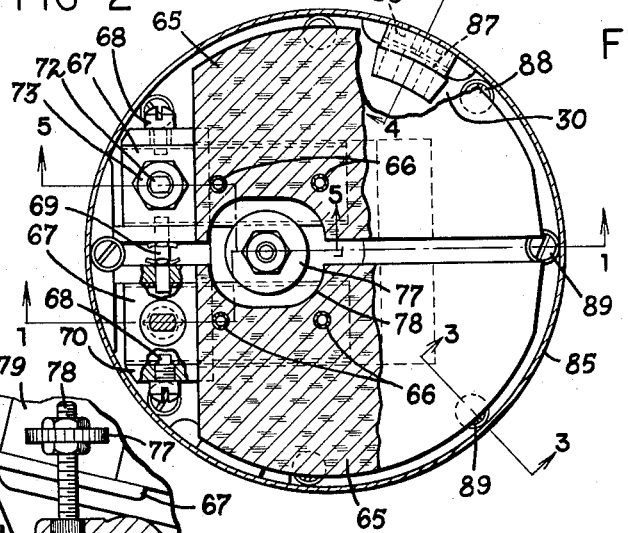
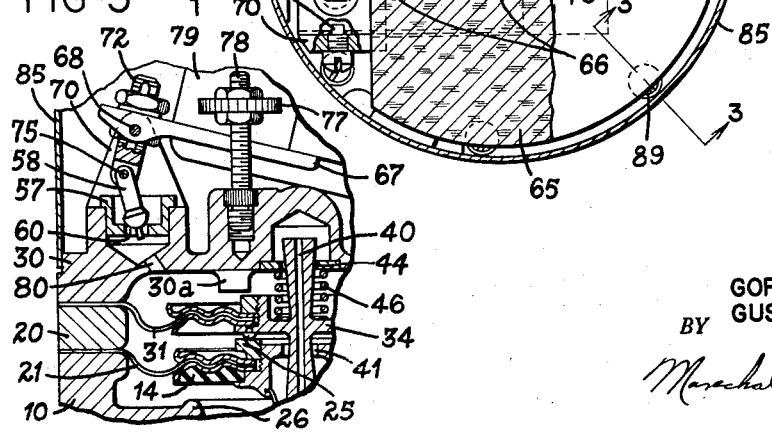
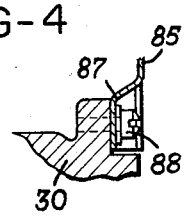
INVENTORS
GORDON T. KOEHLER &
GUSTAVE J. KOEHLER
BY
ATTORNEYS July 15, 1958  G. T. KOEHLER ET AL  2,843,145
VALVE MECHANISM
Filed March 27, 1953  3 Sheets-Sheet 2
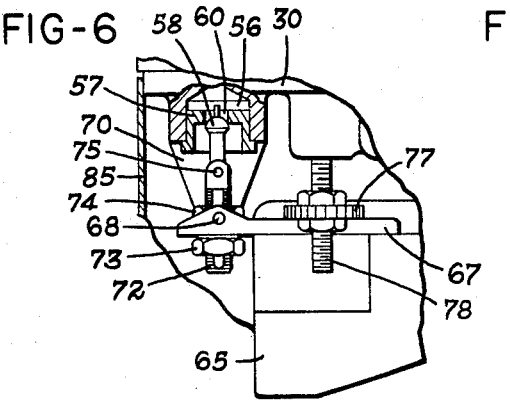
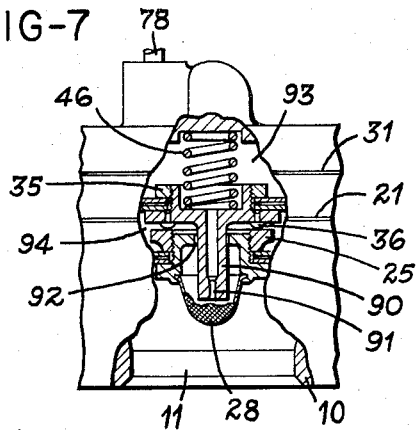
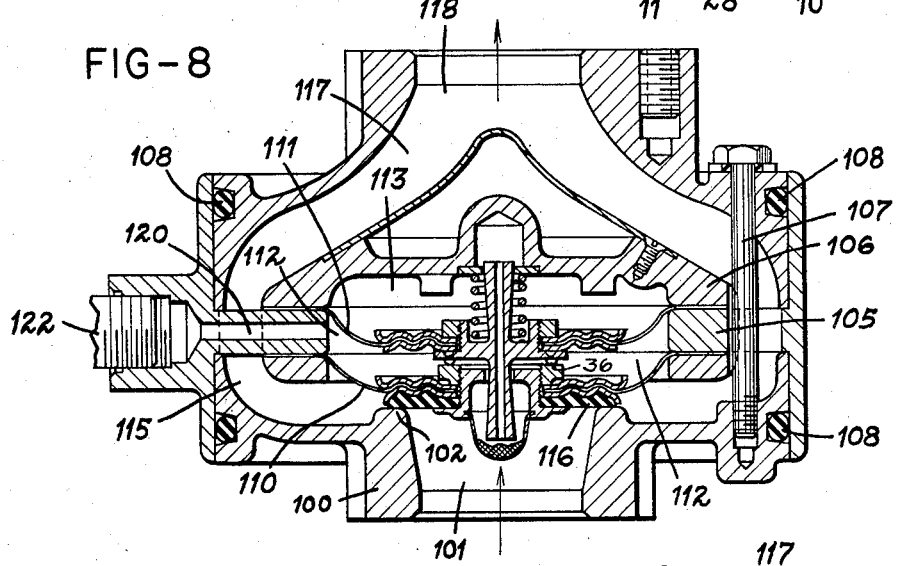
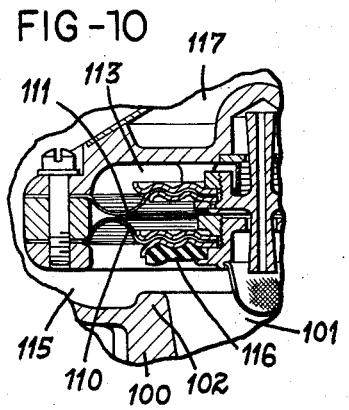
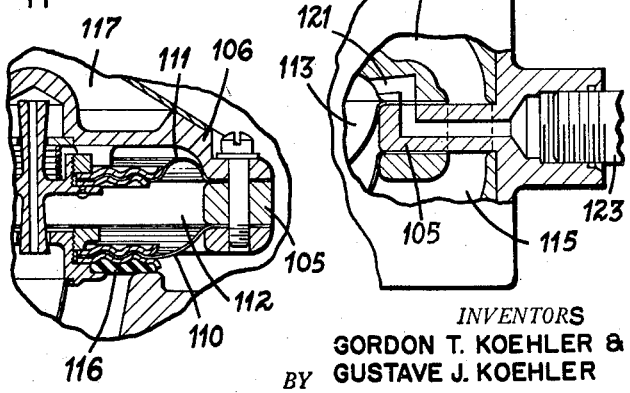
*INVENTORS*
GORDON T. KOEHLER &
BY GUSTAVE J. KOEHLER
ATTORNEYS

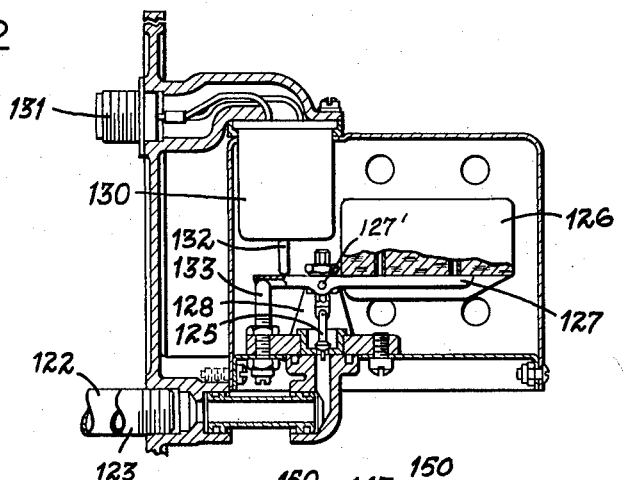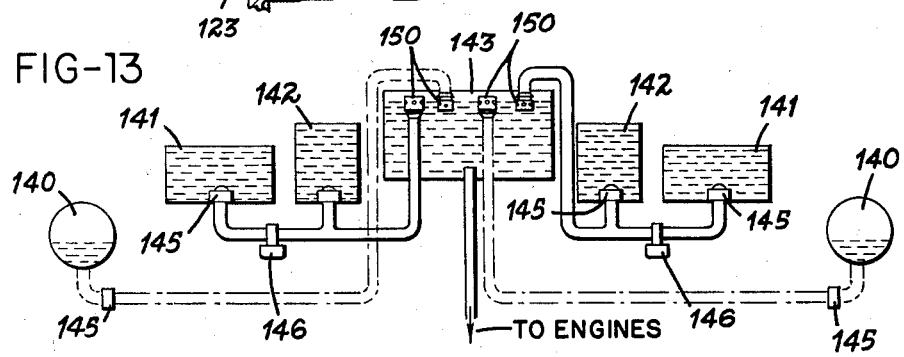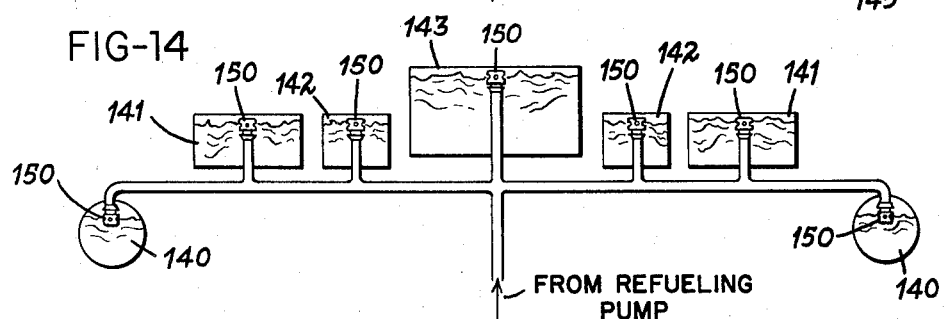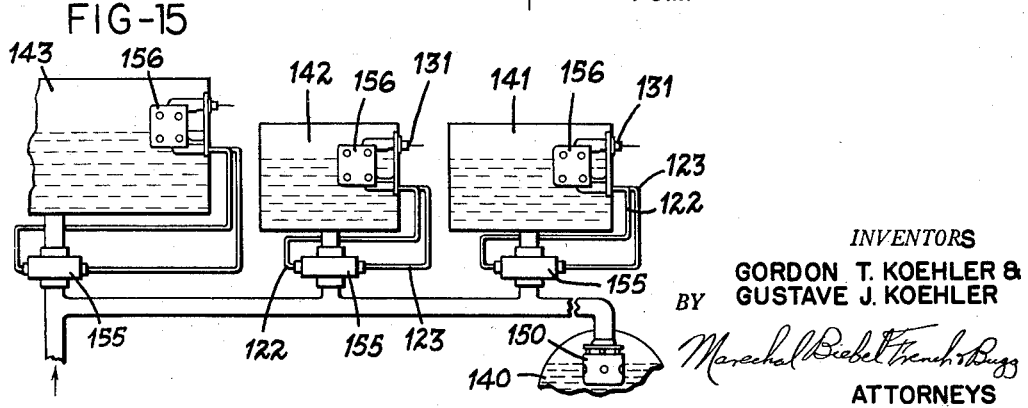

United States Patent Office 2,843,145
Patented July 15, 1958

2,843,145
VALVE MECHANISM

Gordon T. Koehler and Gustave J. Koehler, Dayton, Ohio, assignors to Koehler Aircraft Products Company, Dayton, Ohio, a corporation of Ohio Application March 27, 1953, Serial No. 345,044

6 Claims. (Cl. 137—414)

This invention relates to valve mechanism and more particularly to valves for controlling the level of fluid in a reservoir, tank, or the like.

It is the principal object of the invention to provide a fluid level control valve which is safe and reliable in operation, which is simple and economical in construction, which is light in weight and adapted for use on aircraft and the like, and which can be used in different locations and for different applications without material change in its assembly.

It is also an object to provide a valve for controlling the fluid level in a tank or other reservoir, the valve being located either within the reservoir or remote therefrom but responsive to the level therein as desired, for example, where the reservoir is a disposable fuel tank the valve being outside the tank so that it will not be lost when the tank itself is dropped.

It is a further object to provide such a valve which may also be controlled independently of the liquid level where it is desired to close the valve and stop the flow of liquid before a predetermined level has been reached.

Other objects and advantages will be apparent from the following description, the accompanying drawings, and the appended claims.

In the drawings—

Fig. 1 is a sectional view through a valve mechanism in accordance with the invention on the broken line 1—1 of Fig. 2, the parts being in the position corresponding to the closing of the valve;

Fig. 2 is a sectional view on the broken line 2—2 of Fig. 1;

Figs. 3 and 4 respectively are broken fragmentary sectional views on the lines 3—3 and 4—4 of Fig. 2 respectively;

Fig. 5 is a partial view in section on the line 5—5 of Fig. 2 showing the valve in open position;

Fig. 6 is a view of a modified installation in which the level control is inverted and the float correspondingly repositioned;

Fig. 7 is a view partly in section and partly in elevation showing a valve similar to Fig. 1 but for use with low pressure systems where surge control is not required;

Fig. 8 is a flow control valve intended to be used in a fluid supply line outside the reservoir and hence adapted for installation in an aircraft fueling system incorporating disposable fuel tanks;

Fig. 9 is a detail view of the valve of Fig. 8 showing the bleed port passage from the upper pressure chamber;

Figs. 10 and 11 are views of the valve mechanism of Fig. 8 with the valve in the open and closed position, respectively, Fig. 11 differing from Fig. 8 in that pressure to close the valve has been developed only in the lower pressure chamber;

Fig. 12 is a view principally in section showing the remote level control mechanism for use in the reservoir in conjunction with the valve of Figs. 8 to 11;

Fig. 13 is a diagrammatic view showing a typical arrangement of the valve mechanism of the present invention installed in tanks or fuel reservoirs adapted to supply the fuel to engines or the like;

Fig. 14 is a diagrammatic view of an installation for filling individual fuel tanks; and Fig. 15 is a diagrammatic installation in which the valves are located outside the reservoirs and controlled by level mechanisms within the reservoirs.

Referring to the drawings which illustrate preferred embodiments of the invention, and more particularly to the forms shown in Figs. 1 through 5, the valve comprises a lower housing member 10 having an inlet 11 adapted to receive the supply pipe of the fluid pressure supply system, any suitable mechanism being used as desired to fasten the supply pipe properly in place in the housing inlet. The housing has an inwardly projecting rim 12 which forms a valve seat against which the valve 14 is adapted to move to control the main flow of fluid therethrough. The housing has a series of radially opening slots 16 (Fig. 3) which form the main discharge passage for the flow, it being understood that this form of the device is intended to be located directly within the reservoir itself.

Above housing 10 is a ring 20 which clamps a flexible diaphragm 21 between itself and the housing. Centrally of the diaphragm 21 there are provided a pair of ribbed metal plates 22, 23 which are seated upon a central fitting 24 and clamped thereon by means of a clamping ring 25. The fitting 24 has an inturned lip 26 which holds the valve member 14 in place and has another inturned lip 27 which secures a strainer 28 in position over its central part. It will be evident from the above that the diaphragm 21 can flex and in doing so will move the fitting 24 and the valve seat along with it thereby moving the valve between closed and open positions.

An upper housing member 30 is mounted on top of ring 20 and a second flexible diaphragm 31 is secured therebetween. Similar ribbed plates 32 and 33 are secured on a central fitting 34 and locked in position thereon by means of ring 35. The fitting 34 carries a series of bumpers 36 on its lower face which are adapted to bear against the adjacent face of ring 25 to press the valve assembly downwardly into seating position.

The fitting 34 is formed with an elongated passage 40 having a contoured outer surface which projects through a throttling aperture 41 in the lower fitting member 24 and into continuing communication with the main flow passage, directly inwardly of screen 28. At its upper end, passage 40 opens into a recess 43 in the housing 30 from which fluid can flow through an aperture 44 in a throttling plate 45, fixed in the upper housing member. A spring 46 seated within a recess in fitting 34 and bearing against the fixed plate 45 normally urges the upper diaphragm and through it the lower diaphragm in a downward direction thus insuring that valve member 14 is normally against its seat 12.

It will be evident from the above that communication is provided from the main flow passage at all times into the pressure chamber 50 between diaphragms 21 and 31 through the flow passage 41. It will also be evident that by reason of the tapered or contoured surface of the passage member 40 on its outer circumference, the rate of flow of fluid through the passage 41 will vary as the position of the diaphragms relative to each other changes in operation. Similarly communication is established at all times from the fluid pressure supply into upper pressure chamber 52 through the open bore of passage 40 and through the throttling aperture 44, the size of which will be similarly varied in accordance with the movement of the diaphragm relative to the housing. Since the diaphragms and pressure chambers 50 and 52 are materially greater in area than the area of the valve seat 12, application of line pressure into either or both pressure chambers 50 and 52 will provide for forcibly moving the valve member 14 into closing relation upon seat 12.

Pressure in the lower pressure chamber 50 is controlled by means of a passage 55 communicating directly with the chamber and leading into a recess 56 in housing 30 into which there is fitted a valve seat 57 controlled by a valve member 58. The valve seat has a bleed port 60 therein which is relatively small but of larger capacity than throttling aperture 41, and the flow from which is stopped when valve 58 is seated in closed position.

The seating of valve 58 is controlled by means of a float 65 of cork or the like held by means of rivets 66 on a carrier plate 67, the latter being pivotally mounted on pins 68 and 69 suitably supported on the upstanding ears of a bracket 70 secured to housing 30. A threaded stem 72 extends through the plate 67 and is bolted in a predetermined adjusted position thereon by means of nuts 73, 74. The stem projects downwardly and is attached by a pivot pin 75 to the upper end of valve member 58, thereby forming a toggle arrangement for the control of the opening and closing movement of the valve which applies an increasing seating pressure as the float moves the valve into closing position.

A similar passage 80 leads from upper chamber 52, this passage opening into a similar recess 56 controlled by another float controlled valve 58, identical in construction and arrangement with the valve already described, and accordingly both float and bleed control valve structures are given the same reference numerals, the two assemblies being shown in side by side relation in Fig. 2. In each case the upward movement of the float is limited by means of a stop 77 adjustably mounted on a threaded pin 78 fixed to the housing 30 and adapted to be engaged by plate 67 in the fully raised position of the float, the float being inwardly recessed at 79 to accommodate the stop.

A cover shell 85 apertured at 86 encloses and protects the float, and is mounted on the upper housing 30 and secured by means of offset portions 87 and bolts 88. Through bolts 89 secure the two housing members 10 and 30 and the ring member 20 together.

The operation of this device is as follows. Assuming the level in the reservoir to be below that desired, both floats 65 will be in the lower position indicated in Fig. 5 with both bleed ports 60 in the open position, the toggle action lifting the valve members 58 well in the clear to assure proper freedom of flow through the bleed ports. The spring 46 prior to connection of the fluid pressure supply has moved both the diaphragms and the main valve 14 downwardly against its seat. However in response to supply of the fluid pressure to inlet 11, the pressure on the lower face of valve 14 raises it from its seat with the upward travel being limited by plate 32 moving against lugs 30a, and the fluid flows out the discharge slots 16 and into the reservoir. A small flow of fluid meanwhile takes place through the orifice 41 into the lower chamber and similarly through the bore 40 and orifice 44 into the upper chamber. However both valves 58 are unseated and hence this liquid merely flows out through the bleed ports which are of sufficient size to handle the flow through the orifices without developing pressure within either pressure chambers 50 or 52.

Both floats 65 are preferably adjusted to operate at the same level and hence should both rise against their stops when that predetermined level is reached. As each float rises, the toggle action is such that its associated valve 58 is forcibly closed and maintained in such position against its seat, thereby stopping further flow through the bleed port. The pressure supply continues however and hence line pressure is quickly established in both chambers 50 and 52. Since the total area of these chambers is greater than that of the main inlet 12, this will result in the downward movement of both diaphragms, which will be forcibly moved to close valve 14 against its seat 12. This stops further flow into the reservoir but maintains a pressure connection as long as the fluid pressure supply is connected, so that the closing action is forcibly continued.

If for any reason one of the toggle valves 58 should fail to close, or if either diaphragm should fail or develop a leak, the remaining diaphragm will act in the normal manner to move the valve 14 against its seat and thus proper closing action even in the event of partial failure, is assured.

The function of the contoured surface of passage member 40 is to reduce the flow into pressure chambers 50 and 52 as the main valve moves toward its closed position. It will be seen that when this occurs the flow passage 41 or 44 into the respective pressure chamber is throttled and reduced, this having been found desirable as avoiding surge conditions, particularly where the supply line is operating under relatively high pressure, and to assure smooth closing operation.

In some instances it is desirable to mount the valve in an inverted position, as for example, where there is limited installation space for piping due to particular tank arrangements or where it is desired to fill from above. Wherever the inverted mounting is apparent it is necessary only to relocate stop 77 on pin 78 to the opposite side of plate 67 as shown in Fig. 6. The function of the valve is unchanged and operates as described without further modification.

In systems where the pressure of the fluid supply is relatively low, it is not essential that the supply to the pressure chambers be throttled as described above. Fig. 7 shows such an arrangement in which a liquid supply passage 90 is of cylindrical shape on its outer surface, having a through passage 91 of predetermined size and controlling an orifice 92 in the lower diaphragm assembly, for regulating the supply to the upper pressure chamber 93 and lower pressure chamber 94, respectively. In other respects this structure is the same as that already described in Figs. 1 through 5.

Referring now to Figs. 8 through 12 which disclose an embodiment suitable for use where the flow control valve is located outside the reservoir, the valve mechanism includes a lower housing 100 defining an inlet opening 101 and having a valve seat 102. A ring member 105 is mounted between the lower housing member 100 and an upper housing member 106, the parts being secured by studs 107 and sealed by means of O rings 108. A pair of flexible diaphragms 110 and 111 are secured between the respective housing members and ring 105, each diaphragm carrying the same fixture and clamping members as described above in connection with Figs. 1 to 5. These diaphragms together with the housing form lower and upper pressure chambers 112 and 113 respectively.

Flow passages 115 extend outwardly around the central valve member 116 and communicate with similar flow passages 117 in the upper housing member leading to the discharge outlet 118 where a suitable conduit communicates with the reservoir.

Control of the operation of this valve is accomplished by means of a passage 120 communicating with chamber 112 and a similar passage 121 communicating with chamber 113, suitable tubes 122 and 123 respectively leading from such passages to the reservoir where the bleed ports are located. The latter is shown in Fig. 12 in which one of the bleed valves is shown at 125, controlled by float 126 fastened to plate 127 which is pivotally mounted on pin 127' on bracket 128 and which has the same construction of toggle connection to the valve as already described. It will be understood that there are two such assemblies with separate floats and bleed control valves, one connected to each of lines 122 and 123, respectively. When either or both of the bleed ports are closed, the pressure in the corresponding pressure chamber or chambers increases for the reasons already described, and the main valve 116 is forcibly closed to stop further flow into the reservoir.

Fig. 10 shows in a fragmentary view the normal fully opened position of the valve during the flow of fluid therethrough and Fig. 11 shows a view in which only the lower pressure chamber 112 is operative, the upper pressure chamber being collapsed. However as shown even with only on such pressure chamber operating, the main valve is effectively closed against its seat and the flow is stopped.

Where it is desired to shut off the flow into the reservoir independently of or prior to the actuation of the float valves, this may be accomplished as shown in Fig. 12 through the use of a solenoid 130 to which electrical connection may be made at 131 for manual or any other type of control as desired. The solenoid upon operation projects its operating pin 132 downwardly (as in Fig. 12) to engage the overhanging end of plate 127, to thereby lift the float into the position shown in Fig. 12, with resultant closing of the bleed port and the corresponding closing of the main flow valve. A stop 133 limits the travel of the float and bracket to a proper limit.

A typical installation in accordance with the present invention is shown in Fig. 13 in which a series of tanks 140, which may be the outer wing tanks of an aircraft, and inner tanks 141, 142 and a central tank 143 are arranged to be connected for maintaining a balanced fuel distribution as they are depleted. Pumps 145 are located at the base of each tank and controls 146 may be used to shut off certain of the tanks from the system. Each pump will deliver from its corresponding tank into the main engine fuel tank 143 at the highest level under control of the level valve mechanism 150, that is, the valve of the present invention.

For refueling and filling fuel tanks, Fig. 14 shows a typical installation in which the fuel valves of the present invention are shown at 150, for establishing a proper level in each of the separate tanks.

Fig. 15 shows an arrangement in which a separate fuel valve 155 corresponding to the form shown in Figs. 8 through 11 is located outside the reservoir with the liquid level control member 156 corresponding to that shown in Fig. 12 located within the tank. The system embodies a group of tanks of different construction and another reservoir in which the valve mechanism 150 is received within the tank itself.

It will thus be evident that the present invention represents a simple and highly flexible and adaptable valve construction which may be used in different applications and for different purposes to safely and reliably control the level of the fuel in a reservoir. It is especially adapted for aircraft use and may be easily adapted for positioning in the reservoir itself, or remote therefrom, as desired in each application.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Valve mechanism for controlling the supply of fluid under pressure into a reservoir to maintain a predetermined level therein comprising a housing outside said reservoir, a valve seat in said housing in the path of flow of pressure fluid thereinto, a discharge connection from said valve seat and housing for supplying the fluid into said reservoir, a pair of flexible diaphragms each having a greater area than said valve seat and defining with said housing a pair of expansible fluid pressure chambers within said housing, a valve member carried by one of said diaphragms adapted to close against said seat, means connected with the other said diaphragm for communicating to said valve member movement of said other diaphragm in the valve closing direction, a bleed port connected to each said chamber, a pair of floats located in said reservoir, means controlled by said floats for opening and closing said bleed ports independently of each other to develop a pressure within that one of said chambers associated with the closed bleed port to cause expansion of that chamber subjected to internal pressure for closing said valve member, means for maintaining communication between said fluid pressure supply and said pressure chambers, and means carried by one of said diaphragms for throttling the passage of fluid into that one or said pressure chambers subjected to internal pressure as said valve member moves toward closed position to avoid pressure surges in the system.

2. Valve mechanism for controlling the supply of fluid under pressure into a reservoir to maintain a predetermined level therein comprising a housing, a valve seat in said housing in the path of flow of pressure fluid thereinto, a discharge connection from said valve seat and housing for supplying the fluid into said reservoir, a flexible diaphragm having a greater area than said valve seat and defining a fluid pressure chamber within said housing, a valve member mounted for closing and opening movement toward and away from said seat, means providing an operating connection between said diaphragm and said valve member for imparting to said valve member movement of said diaphragm in the valve closing direction, a bleed port connected to said chamber, a float located in said reservoir, means controlled by said float for opening and closing said bleed port to develop a pressure within said chamber to cause the closing of said valve, means for maintaining communication between said fluid pressure supply and said pressure chamber, and means for closing said bleed port independently of the operation of said float.

3. Valve mechanism for controlling the supply of fluid under pressure into a reservoir to maintain a predetermined level therein comprising a housing, a valve seat in said housing in the path of flow of pressure fluid thereinto, a discharge connection from said valve seat and housing for supplying the fluid into said reservoir, a pair of flexible diaphragms each having a greater area than said valve seat and defining with said housing a pair of expansible fluid pressure chambers within said housing, a valve member carried by one of said diaphragms adapted to close against said seat, means connected with the other said diaphragm for communicating to said valve member movement of said other diaphragm in the valve closing direction, a bleed port connected to each said chamber, a pair of floats located in said reservoir, means controlled by said floats for opening and closing said bleed ports independently of each other to develop a pressure within that one of said chambers associated with the closed bleeed port to cause expansion of that chamber subjected to internal pressure for closing said valve member, means for maintaining communication between said fluid pressure supply and said pressure chambers, and means for closing at least one of said bleed ports independently of the operation of said floats.

4. Valve mechanism as defined in claim 2 wherein the means for controlling opening and closing of the bleed port includes a pilot valve supported to control flow through said bleed port, and toggle linkage connected between said float and said pilot valve to apply an increasing seating pressure to said pilot valve as said pilot valve moves to bleed port closing position.

5. Valve mechanism as defined in claim 4 wherein the means for closing the bleed port independently of float operation includes a remotely controlled solenoid means operative to close said pilot valve independently of operation of said float.

6. Valve mechanism as defined in claim 3 wherein the means for opening and closing of said bleed ports includes a separate pilot valve associated with each said bleed port and each having an operating connection with an associated one of said floats, and a remotely controlled solenoid means operative to move at least one of said pilot valves to bleed port closing position independently of the operation of the associated said float.

References Cited in the file of this patent

UNITED STATES PATENTS

| | | |
|---|---|---|
| 1,076,351 | Crowell | Oct. 21, 1913 |
| 1,871,044 | Crosthwait et al. | Aug. 9, 1932 |
| 2,037,540 | Rohlin et al. | Apr. 14, 1936 |
| 2,491,521 | Samiran | Dec. 20, 1949 |
| 2,619,108 | Sweeney | Nov. 25, 1952 |
| 2,683,580 | Griswold | July 13, 1954 |
| 2,698,631 | Bashark | Jan. 4, 1955 |
| 2,699,316 | Mosher | Jan. 11, 1955 |
| 2,712,828 | Badger | July 12, 1955 |

UNITED STATES PATENT OFFICE
CERTIFICATE OF CORRECTION

Patent No. 2,843,145                                                      July 15, 1958

Gordon T. Koehler et al.

It is hereby certified that error appears in the printed specification of the above numbered patent requiring correction and that the said Letters Patent should read as corrected below.

Column 5, line 8, for "on such" read -- one such --; column 6, line 10, for "or said" read -- of said --; line 52, for "bleeed" read -- bleed --

Signed and sealed this 21st day of October 1958.

(SEAL)
Attest:

KARL H. AXLINE                                       ROBERT C. WATSON
Attesting Officer                                   Commissioner of Patents